(12) United States Patent
Kato et al.

(10) Patent No.: US 6,679,286 B2
(45) Date of Patent: Jan. 20, 2004

(54) BALL TAP WITH A WATER LEVEL SWITCH

(75) Inventors: Nobuhide Kato, Komaki (JP); Hiroyuki Mizuno, Komaki (JP)

(73) Assignee: Yoshitake Inc., Nagoya (JP)

( * ) Notice: Subject to any disclaimer, the term of this patent is extended or adjusted under 35 U.S.C. 154(b) by 0 days.

(21) Appl. No.: 10/201,274

(22) Filed: Jul. 24, 2002

(65) Prior Publication Data

US 2003/0056827 A1 Mar. 27, 2003

(30) Foreign Application Priority Data

Sep. 27, 2001 (JP) ........................ 2001-296167

(51) Int. Cl.[7] .................... F16K 31/20; F16K 31/08; F16K 33/00
(52) U.S. Cl. ..................... 137/429; 73/308; 73/313; 73/322.5; 137/442; 137/558; 200/84 C; 340/623; 340/624; 251/65
(58) Field of Search .................. 137/392, 429, 137/430, 434, 442, 443, 554, 558; 73/307, 308, 309, 313, 322.5; 251/65; 200/61.2, 84 R, 84 C, 230; 340/623, 624

(56) References Cited

U.S. PATENT DOCUMENTS

| 265,709 A | 10/1882 | Sniffen |
| 1,758,068 A | * 5/1930 | Winfield ................ 137/429 |
| 1,984,394 A | 12/1934 | Candee |
| 2,837,111 A | 6/1958 | Mueller |
| 2,841,169 A | 7/1958 | Martin et al. |
| 3,095,577 A | 7/1963 | Clark |
| 3,255,922 A | * 6/1966 | Socol et al. ............ 137/429 |
| 3,348,242 A | 10/1967 | Wilhelm |
| 3,363,643 A | 1/1968 | Skulski |
| 3,401,717 A | 9/1968 | Lamb |
| 3,408,053 A | * 10/1968 | Vantroba ................ 137/416 |
| 3,419,912 A | 1/1969 | Kertell |
| 3,646,293 A | * 2/1972 | Howard ................ 200/84 C |
| 4,056,979 A | * 11/1977 | Bongort et al. ......... 200/84 C |
| 4,064,755 A | * 12/1977 | Bongort et al. ............ 73/313 |
| 4,180,095 A | * 12/1979 | Woolley et al. ......... 137/429 |
| 4,186,419 A | * 1/1980 | Sims .................. 200/84 C |
| 4,216,555 A | 8/1980 | Detjen |
| 4,296,505 A | 10/1981 | Chien-Sheng |
| 4,865,073 A | * 9/1989 | Kocher ................ 137/429 |
| 4,924,703 A | * 5/1990 | White et al. ............. 73/308 |
| 5,025,827 A | * 6/1991 | Weng ................... 137/392 |
| 5,544,685 A | * 8/1996 | Stieferman .............. 141/198 |
| 5,816,282 A | * 10/1998 | Hornung et al. ........ 137/442 |

FOREIGN PATENT DOCUMENTS

| BE | 514398 | * 10/1952 | ............. 137/429 |
| DE | 669581 | * 12/1938 | ............. 137/429 |
| FR | 706230 | * 6/1931 | ............. 137/429 |
| GB | 408946 | * 4/1934 | ............. 137/429 |
| IT | 488818 | * 1/1954 | ............. 137/429 |

* cited by examiner

Primary Examiner—George L. Walton
(74) Attorney, Agent, or Firm—Apex Juris, pllc; Tracy M. Heims

(57) ABSTRACT

A compact ball tap with 1 a water level switch which comprises a guide standpipe 5 vertically arranged in a tank T, a float 6 slidably installed on the guide standpipe 5, a valve 3, a lever 4 controlling an open-close action of the valve 3 connected with the float 6, and a water level switch 29 transmitting predetermined control signals when the float 6 shifts to a predetermined water level, wherein one float 6 is shared by the ball tap 1 and the water level switch 29.

4 Claims, 5 Drawing Sheets

BALL TAP WITH A WATER LEVEL SWITCH

FIELD OF THE INVENTION

This invention relates to a ball tap with a water level switch installed therein.

DESCRIPTION OF THE PRIOR ART

A conventional water supply system has a tank generally comprising a ball tap and a float switch.

The ball tap is configured such that a lever extending therefrom ramps downward to reach a float formed thereon. The float makes a vertical movement along the lever swing in response to the changing water level within a tank. The vertical motion of the float automatically regulates the water level by means of feeding or suspension of water feeding so as to maintain a predetermined water level within the tank.

The float switch system is sensing system. At a predetermined water level within the tank a switch is activated by another float due to the float's vertical movement within the tank in response to the changing water level within the tank. Upon reaching the predetermined water level another device, such as an alarm unit and/or an indicating lamp, connected to the float switch, verifies the water level within the tank.

The conventional ball tap and float switch described above are separate, independent units, each having a float as a functional element of the device. Accordingly, if the horizontal sectional area of the tank is rather small, the two floats, one of the ball tap and the other of the float switch, may interfere with each other. This generally becomes a significant obstacle for an appropriate arrangement of the ball tap and the float switch in the same tank.

OBJECT AND SUMMARY OF THE INVENTION

This invention is made to improve the above-identified drawbacks of the conventional device and is to provide a compact device with only one float shared by a ball tap and a float switch, hereinafter water level switch, wherein the ball tap comprises a guide standpipe perpendicularly extending within a tank a float, freely slidable and axially mounted on standpipe; a valve system; and lever, linking the float, capable of operating the valve system; and the float and the standpipe together include the water level switch, where the water level switch transmits a water level control signal upon the float reaching a predetermined water level.

EMBODIMENT OF THE INVENTION

An embodiment of this invention is explained below with reference to accompanying drawings.

Figure 1:
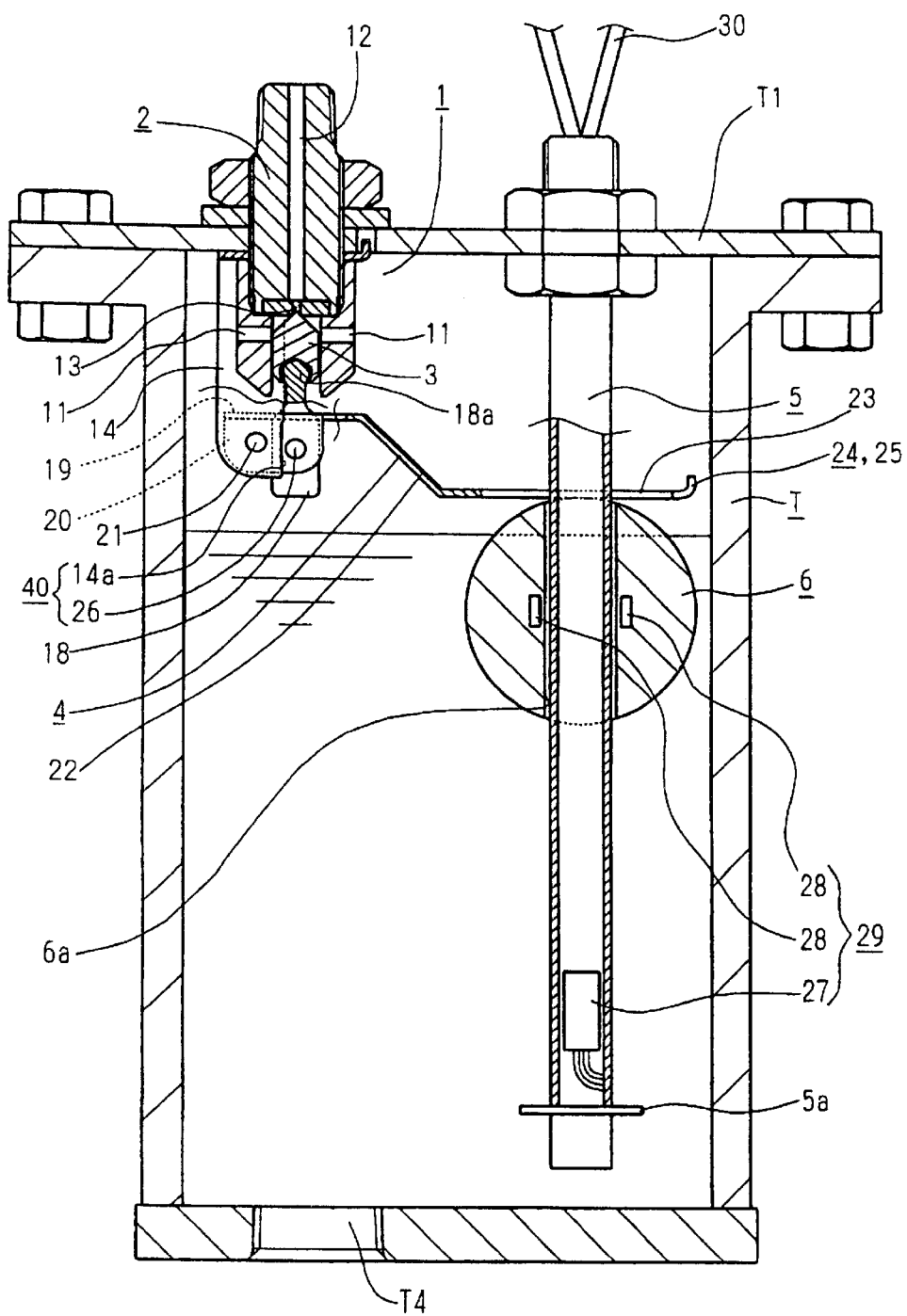
FIG. 1 is a cross-sectional view of the ball tap installed in the tank while the valve is closed.
Figure 2:
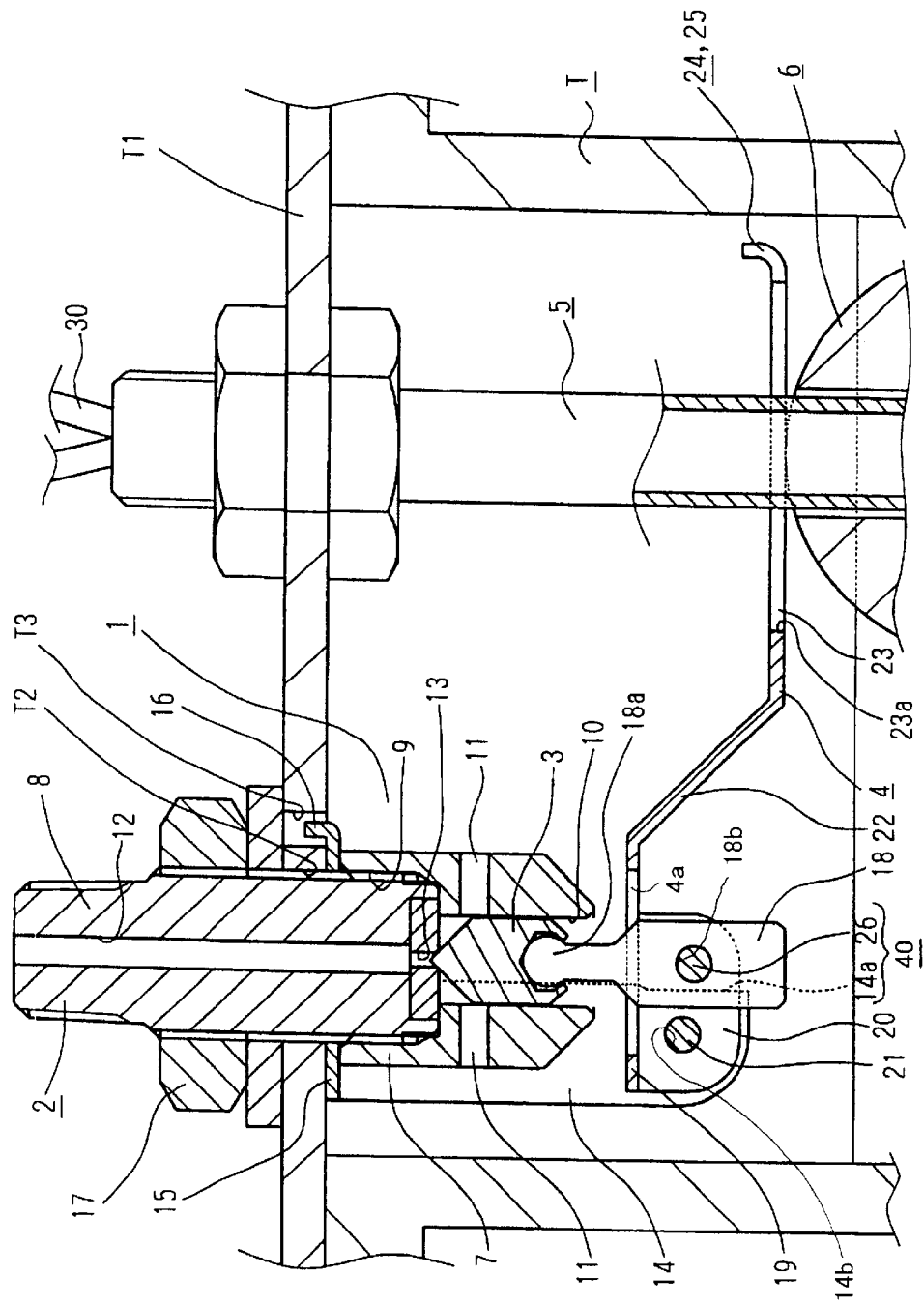
FIG. 2 is an enlarged view of a critical section of FIG. 1.

A ball tap 1 of FIG. 1 mainly comprises a valve body 2 mounted on a ceiling T1 of a tank T, a lever 4 operating a valve 3 built in the valve body 2, a guide standpipe 5 perpendicularly extending within the tank T, and a float 6 freely slidable and axially mounted on the guide standpipe 5 and linked with the lever 4.

The valve body 2 comprises a cylindrical valve guard 7, having a groove that appears rectangular in the cross-sectional view, and a vertical valve bolt 8, where the diameter of the valve bolt 8 is smaller than that of the cylindrical valve guard 7, such that the valve bolt 8 is capable of being screwed in to and out from the cylindrical valve guard 7.

The cylindrical valve guard 7 has an internal thread 9, formed between its upper and intermediate portions, to screw a lower end of the vertical valve bolt 8 therein. The cylindrical valve guard 7 also has a valve guide bore 10, a diameter of which is smaller than that of the internal thread 9, arranged in series with the internal thread 9 and starting from the lower end of the cylindrical valve guard 7 leading to and in series with the internal thread 9. The cylindrical valve guard 7 further has a secondary valve channel 11 running from an outside of the cylindrical valve guard 7 in an orthogonal direction relative to and communicating with the valve guide bore 10.

The vertical valve bolt 8 has a primary valve channel 12 running in its axial direction and a valve seat 13 formed inside the cylindrical valve guard 7 at a lower end of the primary valve channel 12 communicating with the valve guide bore 10, thereby establishing the communication between the primary valve channel 12 and the secondary valve channel 11 via the valve seat 13.

A pair of lever support arms 14, 14 that face each other, parallelly extend down and exceed the cylindrical valve guard 7, along a vertical line of the cylindrical valve guard 7, on a surface without covering the secondary valve channel 11.

The lever support arms 14, 14 are two facing rectangle plates branching out from a base section 15 and extending from an upper portion of the cylindrical valve guard 7 to extend beyond the bottom line of the vertical valve bolt 8. One surface of the base section 15 without the lever support arms 14, 14 is extended and curved to form a hooking member 16, and, is designed such that an end is raised to hook the ceiling T1. The vertical valve bolt 8 is raised to penetrate a through-hole T2 formed in an appropriate portion of the ceiling T1 in compliance with a diameter of the vertical valve bolt 8. The base section 15 above the cylindrical valve guard 7 faces to abut against a lower surface of the ceiling T1. The hooking member 16 is inserted into a bearing-slot T3 formed in the ceiling T1 adjacent to the through-hole T2 in compliance with size of the hooking member 16. A lock nut 17 is fastened on the vertical valve bolt 8 penetrating and projecting from the upper surface of the ceiling T1 via a washer, thereby establishing a firm joint between the vertical valve bolt 8 and the ceiling T1 and also between the valve body 2 and the ceiling T1. Accordingly, the secondary valve channel 11 communicates inside the tank T; and the upper end of the vertical valve bolt 8 or the primary valve channel 12 is connected with a feeding side of a water supply system.

The valve 3 is a poppet valve strokably vertically inserted and housed in the valve guide bore 10, wherein the valve seat 13 opens and closes due to a vertical movement of the valve 3 inside the valve guide bore 10. A bottom of the valve 3 has a cavity into which a link 18 proceeds from an opening of the valve guide bore 10.

The link 18 has a spherical journal 18a on top snapped in the cavity of the valve 3 at its bottom establishing a linkage between the link 18 and the valve 3 wherein the link 18 swings according to the valve stroke of the valve 3.

The lever 4 has an upper stepped end portion 19 wherein two facing pivot walls 20, 20 are suspended from two facing end surfaces in cross direction thereof, and the lever 4 is pivotally supported at a first pivot section composed of a first pivot pin 21 and pairs of first pivot holes 14b, 14b and second pivot holes 20a, 20a.

The lever 4 is designed such that a lower portion of the link 18 proceeds into and penetrates an opening 4c around the upper stepped end portion 19 and is pivotally supported with the pivot walls 20, 20 at a second pivot section composed of a second pivot pin 26 and pairs of third pivot holes 18b, 18b and fourth pivot holes 20b, 20b, wherein the lever 4 rotates to stroke the valve 3 via the link 18, thereby enabling the valve 3 to open and close. While the lever 4 is rotating, the link 18 follows that rotation to make a vertical curvature movement because of the spherical journal 18a on top of the link 18. Accordingly, the valve 3 may smoothly make a straight vertical stroke along an inner surface of the valve guide bore 10.

Figure 3:
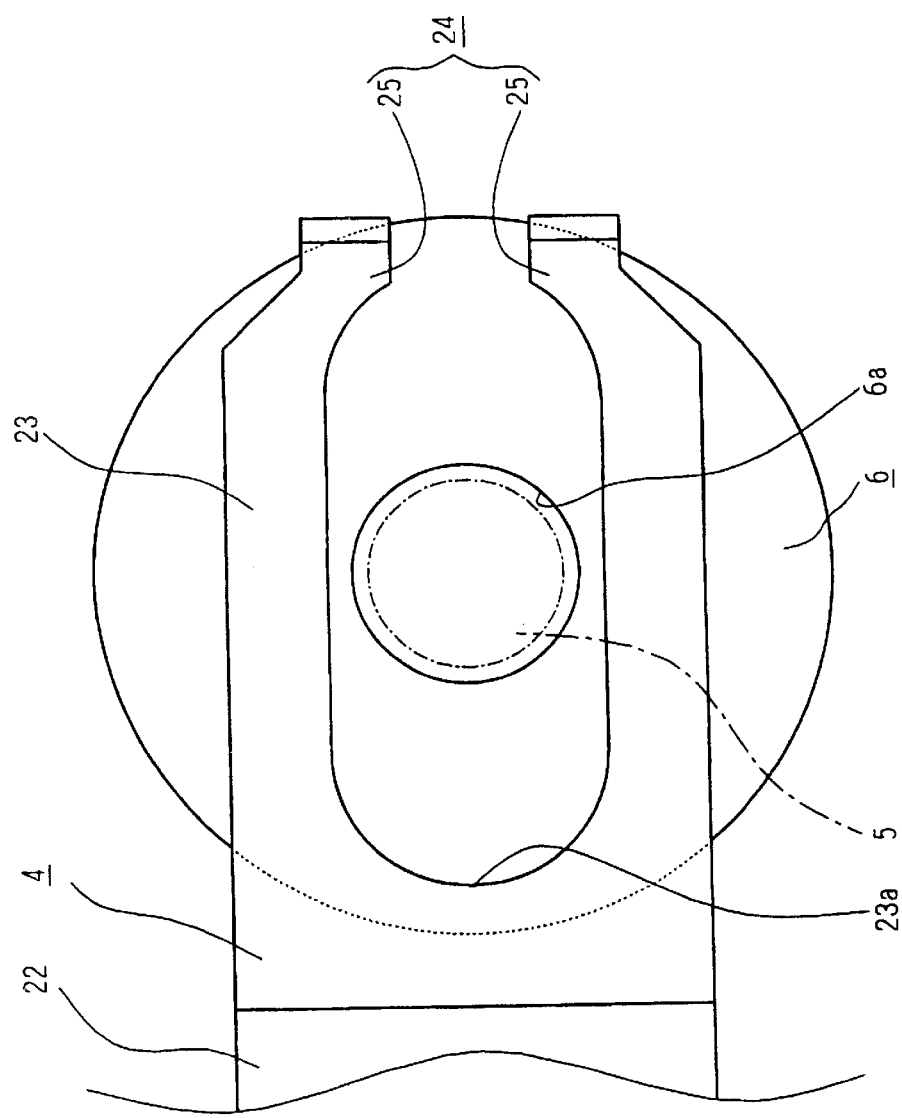
FIG. 3 is a plan view of the lever end.

The lever 4 in its axial direction has an intermediate slope 22 extending downward from the upper stepped portion 19 and a lower stepped end portion 23 parallel to the upper stepped portion 19. As shown in FIG. 3, the lower stepped end portion 23 is branched into two forked legs 23a, 23a between which the guide standpipe 5 is freely positioned with a small gap therebetween. The lower stepped end portion 23 detachably contacts the float 6, freely slidable and axially mounted on the guide standpipe 5.

Figure 4:
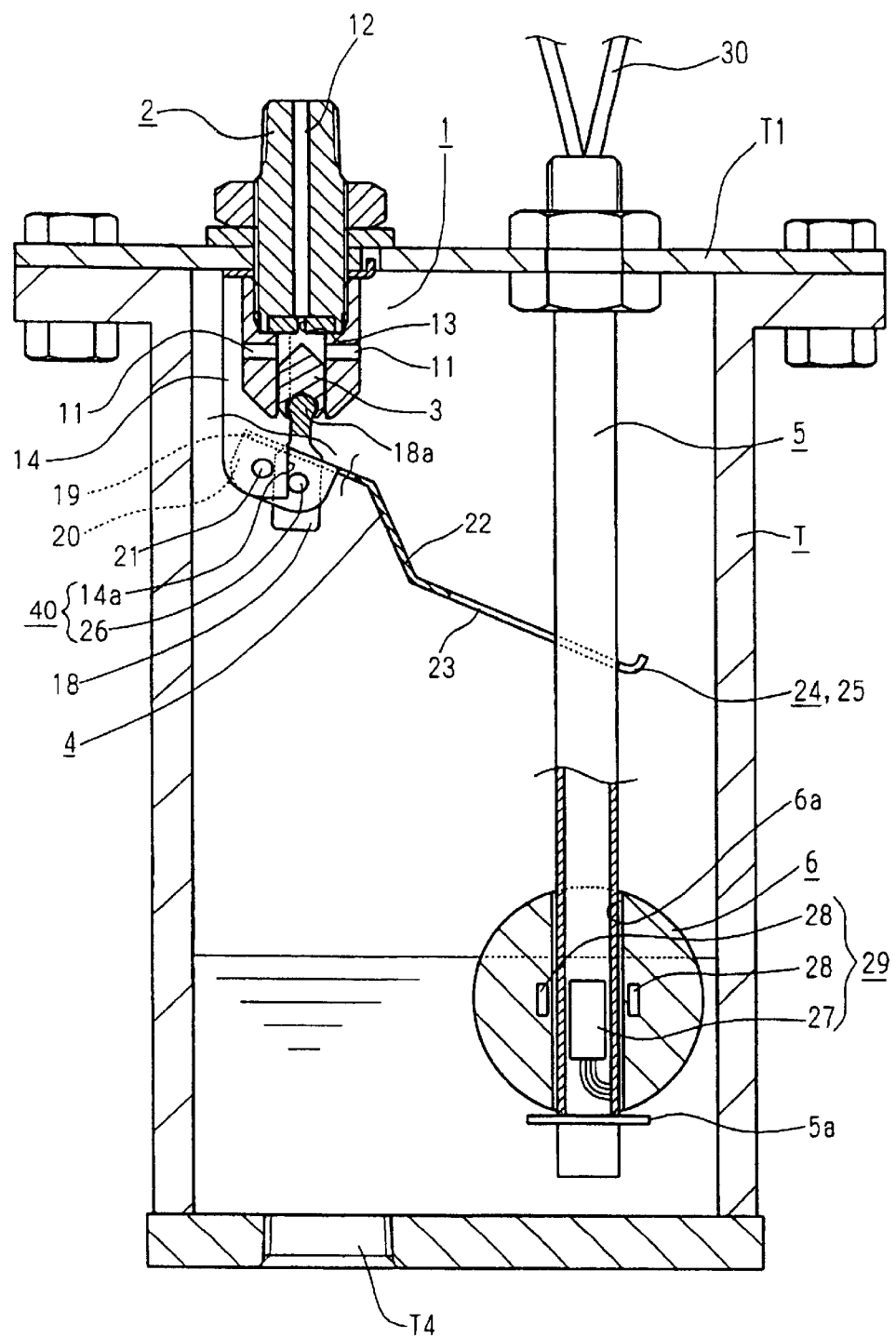
FIG. 4 is a cross-sectional view of the tank with low water level.
Figure 5:
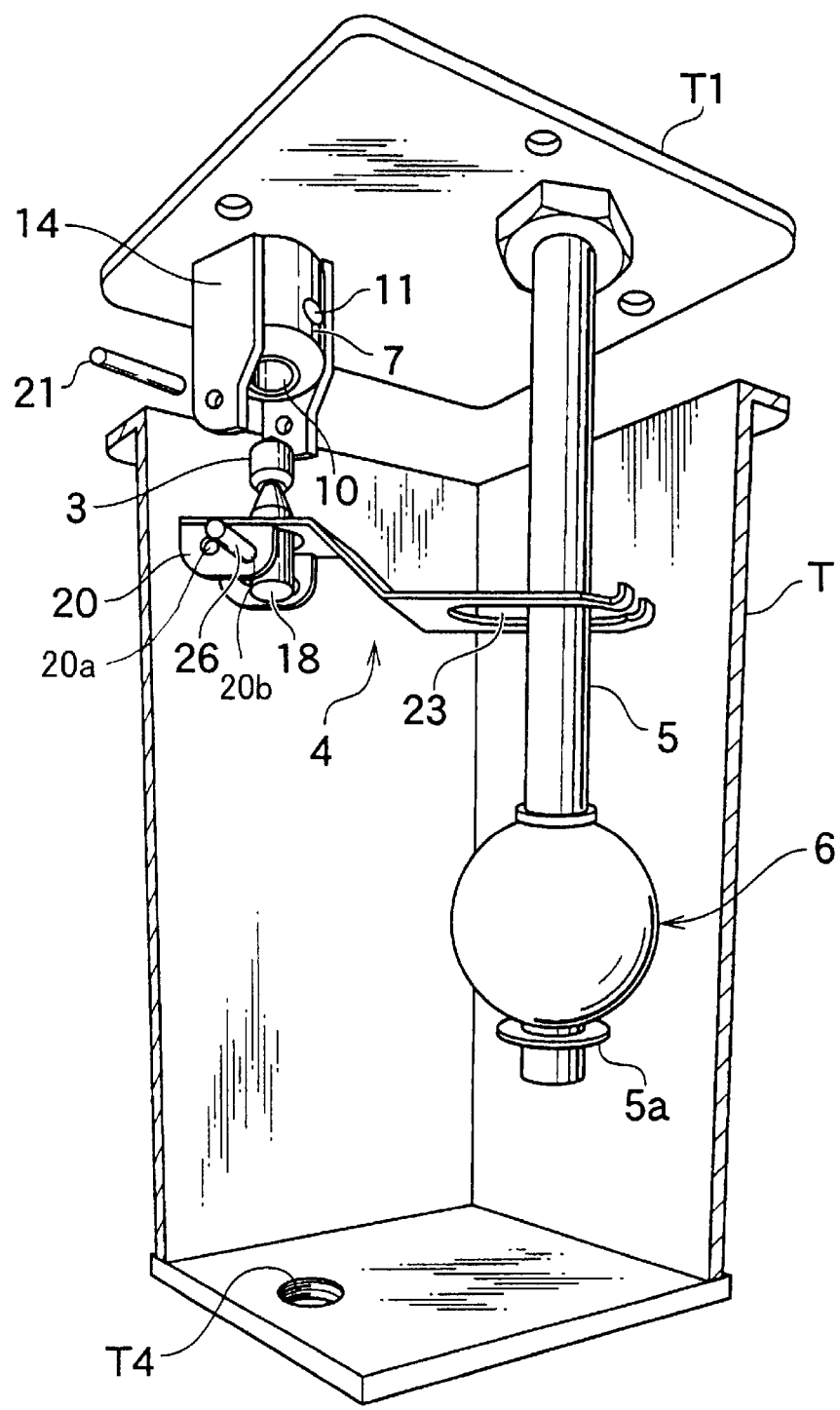
FIG. 5 is an exploded view of the tank.

If the float 6 sank to depart from the lower stepped end portion 23, the lever 4 is designed such that a stopper 24 prevents the guide standpipe 5 from being displaced and maintains its position between the forked legs 23a, 23a as shown in FIG. 4, thereby restricting the lever 4 to control the lowest possible position of the same. Accordingly, when the float 6, once departed from the lower stepped end portion 23, re-rises due to the increase in the water level, the lower stepped end portion 23 re-contacts the float 6 to recreate the ability to rotate the lever 4 counterclockwise.

As a concrete example of the configuration of the primary stopper 24, each end of the forked legs 23a, 23a on the lever 4 is curved to narrow a clearance therebetween, thereby forming engagement protrusions 25, 25 as shown in FIG. 3, so that the guide standpipe 5 engages the engagement protrusions 25, 25 when the float 6 departs downward from the lower stepped end portion 23 of the lever 4 as shown in FIG. 4.

Further, the second pivot pin 26 penetrates the lever support arms 14, 14, the pivot walls 20, 20 therebetween suspended from the upper stepped end portion of the lever 4, and the link 18 therebetween such that each end of the second pivot pin 26 penetrate and project from lower outer surfaces of the lever support arms 14, 14. The second pivot pin 26 may be abutted against an abutment section 14a at the lower end side of the vertical lever support arms 14, 14. If the float 6 departs downward from the lower stepped end portion 23 of the lever 4, the second pivot pin 26 abuts against the abutment section 14a to stop further movement, thereby maintaining the condition of the guide standpipe 5 being held between the forked legs 23a, 23a of the lower stepped end portion 23 above the float 6. This mechanism also functions as a secondary stopper 40.

This embodiment explains the two types of stoppers 24 and 40, which is not a prerequisite of this invention in that only one of two types are required. Also, the stoppers 24 and 40 are not limited to the above types as long as the guide standpipe 5 is held between the forked legs 23a, 23a when the float 6 departs downward from the lever 4.

A core of the guide standpipe 5 is hollowed throughout in a longitudinal direction between an appropriate location on the ceiling T1 and a bottom side in the tank T, a bottom end of which is sealed and is clipped by a flange ring 5a functioning as a stopper for the float 6. The guide standpipe 5 has a lead switch 27 built in its appropriate portion, for example, at a lower, hollowed end of the guide standpipe 5 in FIG. 4.

The float 6 has a magnetic means 28 adjacent to a center through-hole 6a cleared on an axial line of the float 6 freely allowing a smooth, vertical movement of the float 6 along the guide standpipe 5.

When the float 6 shifts to a predetermined position due to the change in the water level, i.e., when the float 6 shifts to a position where the magnetic means 28 of the float 6 faces the lead switch 27 of the guide standpipe 5, a magnetic force from the magnetic means 28 activates the lead switch 27 to be turned on while when the float 6 shifts back to depart the magnetic means 28 from the lead switch 27, the lead switch 27 is turned off. Accordingly, a combination of the lead switch 27 and the magnetic means 28 constitutes water level switch 29

An upper portion of the guide standpipe 5 projects through the upper surface of the ceiling T1. Lead wires 30, 30, one side of which are electrically connected with the lead switch 27, establishing a signal communication therebetween, and the other side of which are drawn out from the projected end of the guide standpipe 5 establishing a connection between the lead wires 30, 30 and a control device (not shown in figures) equipped in the water supply system including the tank T.

In this embodiment, the lead switch 27 is housed in the lower portion of the guide standpipe 5. In case of failure to feed the tank T, such as a water failure, thereby lowering the water level to a predetermined extent within the tank T, the lead switch 27 signals indicating the failure. The signal from the lead switch 27 is transmitted to the control device so that the water feeding function is disabled automatically suspending the water running from a drain T4 formed on a bottom surface of the tank T to a tube located thereafter.

The lead switch 27 is not limited to what is described above, wherein multiple leading switches may be used in the guide standpipe 5 as necessary to determine the appropriate water level in the tank T and to transmit on-off signals for control purpose; and the lead wires 30, 30 may be connected with an alarm system, an indicating lamp, or any of a variety of electronic systems designed to transmit control signals for warning or indication. Furthermore, the ball tap 1 of this embodiment is installed in the tank T with a relatively small horizontal section surface area, however, the size of the surface area is not limited to what is described herein.

Operation of the ball tap 1 relating to this invention is explained hereunder. The water level in the tank T may be adjusted by shifting the guide standpipe 5 vertically, in either direction together with the valve seat 13. The lock nut 17 is loosened to rotate the guide standpipe 5 in a predetermined direction. Because the cylindrical valve guard 7 is sandwiched between the lever support arms 14, 14 is non-rotational (may not rotate) because of the hooking member 16 fixed in the bearing-slot T3, the vertical valve bolt 8 shifts upward or downward relative to the cylindrical valve guard 7, thereby shifting the position of the valve seat 13 and the position of the valve 3 functioning as a means to open and close the valve seat 13 in compliance with the shifting of the valve seat 13. Also, the swing level of the lever 4 jointed with the valve 3 via the link 18 when the valve 3 is closed is varied; and a floating point of the float 6 contacting the upper end portion of the lever 4 is to be defined as a high water level of the tank T, thereby completing the setting.

A condition in the tank T as shown in FIG. 1 is regarded as the high water level while the valve 3 closes the valve seat 13 to discontinue water feeding. If the water level in the tank T becomes lower (by a predetermined level) than the high water level, the float 6 shifts downward along the guide standpipe 5 according to the change in the water level. Also, the lower stepped end portion 23 of the lever 4 on the float 6 swings downward, and the downward swing of the lever 4 causes the valve 3 to stroke downward to depart from the valve seat 13 via the link 18, thereby opening the valve to establish the communication between the primary valve channel 12 and the secondary valve channel 11 via the valve 13 and automatically begins feeding the tank T.

As this feed water elevates the float 6 up to the position of high water level the valve 3 strokes upward via the lever 4 and the link 18 to close the valve seat 13 automatically closing the valve 3 and disabling the feed water.

In case of failure to feed the tank T, due to something such as a water failure, thereby lowering the water level to a predetermined extent within the tank T, if the magnetic means 28 inside float 6 together with the float 6 moves downward in accordance with the lower water level to face with the lead switch 27 positioned inside the lower portion of the guide standpipe 5, the magnetic force of the magnetic means 28 activates the lead switch 27 to turn the control device on, so that the water feeding function is disabled automatically suspending the water running from a drain T4 formed on the bottom surface of the tank T to the tube located thereafter.

Once the above problem, e.g., water failure, is resolved, the water feeding to the tank T is restarted. Then, the float 6 shifts upward departing from the magnetic means 28 therein from the lead switch 27, and the control device is turned off by signals from the lead switch 27. Accordingly, the water feeding function restarts to feed water from a drain T4 formed on the bottom surface of the tank T to the tube located thereafter.

This invention is designed such that the float 6 is slidably and axially mounted on the guide standpipe 5 vertically extending within the tank T and the lever 4 controlling open-close action of the valve 3 is connected with the float 6. Therefore, the float 6 shifting due to the variation of the water level in the tank T functions to automatically start and stop water feeding by the open-close action of the valve 3 via the lever 4 and to maintain the predetermined water level in the tank T. Further, the float 6 and the guide standpipe 5 together have the water level switch 29 designed to transmit the predetermined control signals when the float 6 shifts to the predetermined position on the guide standpipe 5, and the control signals transmitted from the water level switch 29 permits to determine the water level in the tank T.

According to this invention, the ball tap 1 and the water level switch 29 share one float 6, thereby offering a compact device with all claimed functions. Hence, this invention is easily employable in the tank T where tank T has insufficient space for the ball tap and the float switch each to have their own float.

Mere arrangement of the float 6 detachably connecting and disconnecting with the lower stepped end portion 23 of the lever 4 establishes a simple engagement between the float 6 and the lever 4. The valve 3 opens and closes by the lever 4 swinging due to the vertical shifting of the float 6 along the guide standpipe 5, thereby automatically starting or stopping the water feed.

Furthermore, the lever 4 has the stopper 24 restricting the lowest possible position of the lever 4 when swings so as to maintain the condition of the guide standpipe 5 being held between the forked legs 23a, 23a of the lower stepped end portion 23 above the float 6 when the float 6 departs from the lower stepped end portion 23. As shown in FIG. 4, due to the variation of the water level of the tank T, even if the float 6 shifts downward exceeding the effective lever swing range and temporarily departs from the lower stepped end portion 23 of the lever 4, the float 6 will re-elevate to contact the lower stepped end portion 23 of the lever 4 so as to swing the same, thereby functioning the ball tap 1 without any obstacle.

Yet further, the secondary stopper 40 also maintains the condition of the guide standpipe 5 being held between the forked legs 23a, 23 of the lower stepped end portion 23 above the float 6.

While the foregoing invention has been shown and described with reference to several preferred embodiments, it will be understood by those of skill in the art that various changes in form and detail may be made therein without departing from the spirit and scope of this invention

What we claim is:

1. A ball tap comprising: a guide standpipe perpendicularly extending within a tank; a float slidably mounted over and along the standpipe; a mechanical valve system; and a lever operatively disengaging and engaging the float and the valve system so as to open and close the valve, wherein said float and said standpipe together include a water level switch transmitting water level control signals upon the float reaching a predetermined water level as it slideably moves along said standpipe.

2. The ball tap as according to claim 1, wherein the lever detachably contacts an upper spherical surface of the float at its one end thereof; and a stopper thereof restricting to define the lowest position of the lever movement, thereby maintaining an engagement between the lever on the upper spherical surface of the float and the standpipe.

3. A ball tap comprising: a guide standpipe perpendicularly extending within a tank; a float slidably mounted over and along the standpipe; a mechanical valve system; a lever operatively disengaging and engaging the float and the valve system so as to open and close the valve; and a water level switch transmitting water level control signals upon the float reaching a predetermined water level as it slideably moves along said standpipe.

4. The ball tap as according to claim 3, wherein the lever detachably contacts an upper surface of the float at its one end thereof; and a stopper thereof restricting to define the lowest position of the lever movement, thereby maintaining an engagement between the lever on the upper surface of the float.

* * * * *